May 27, 1924.

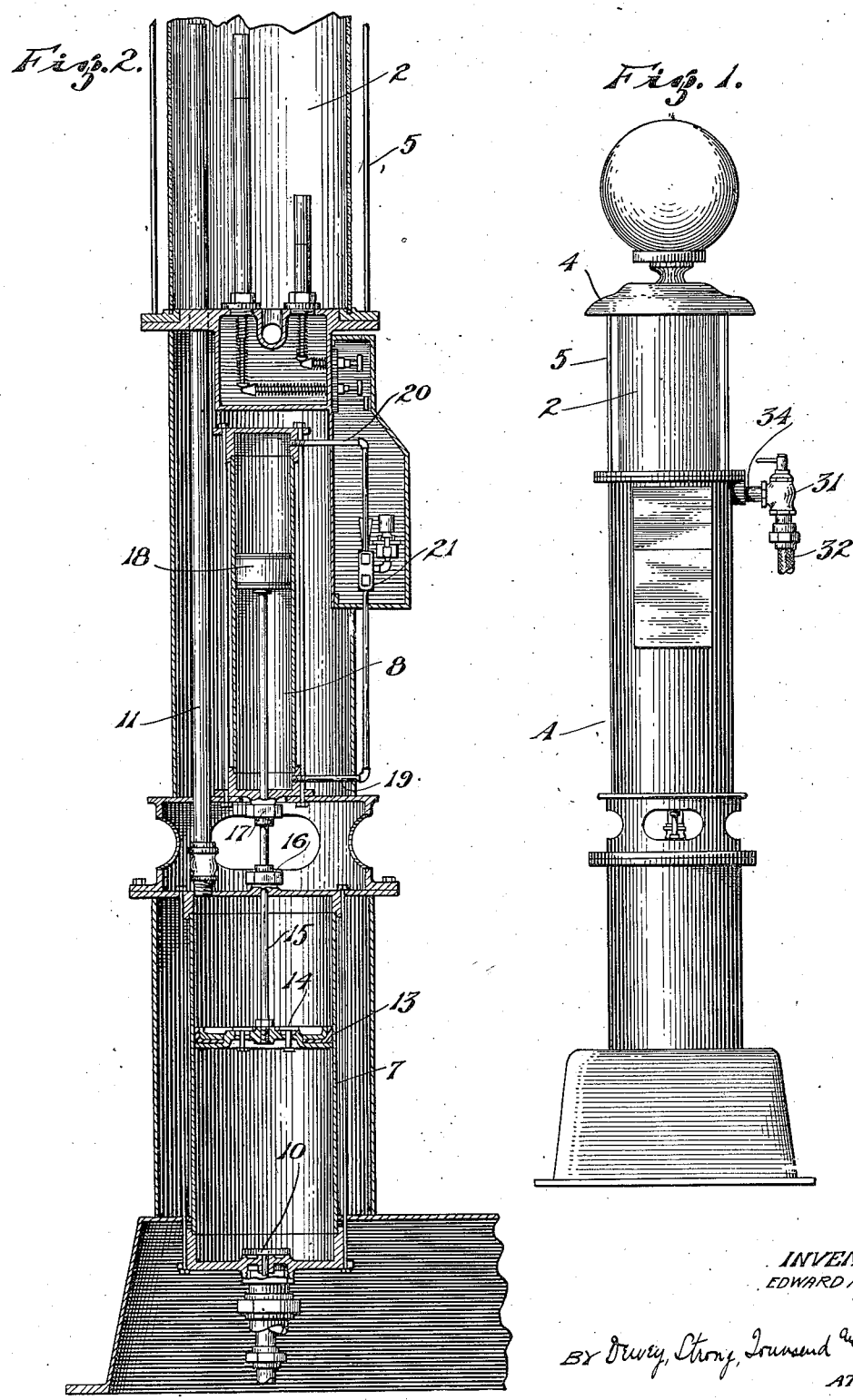

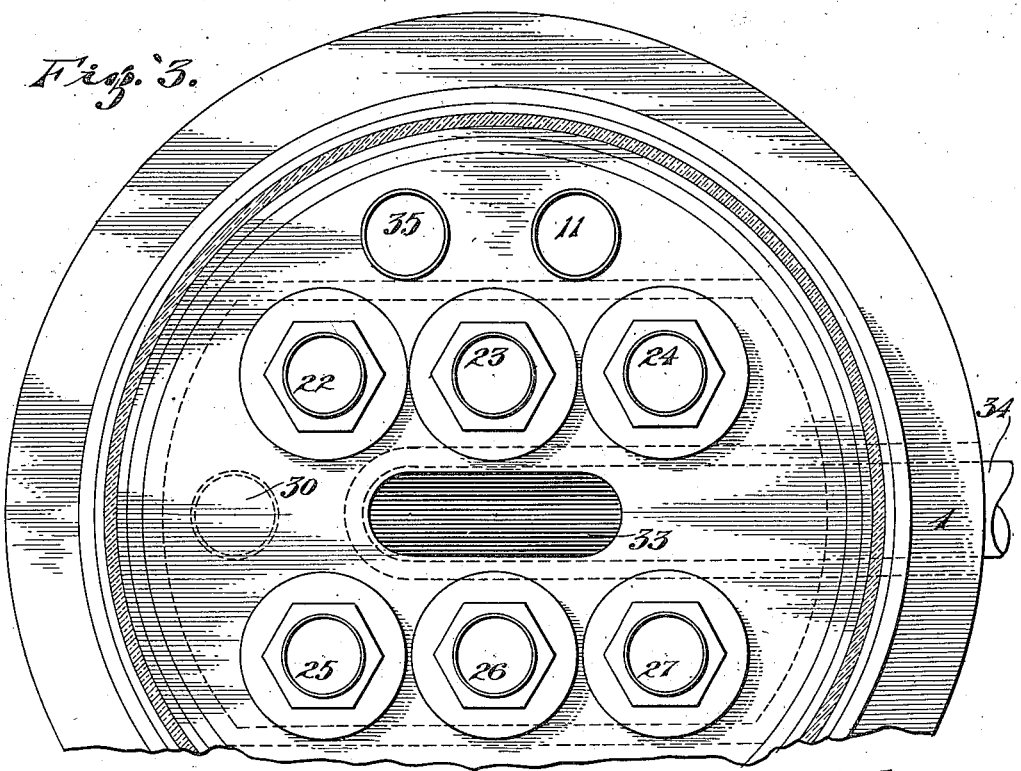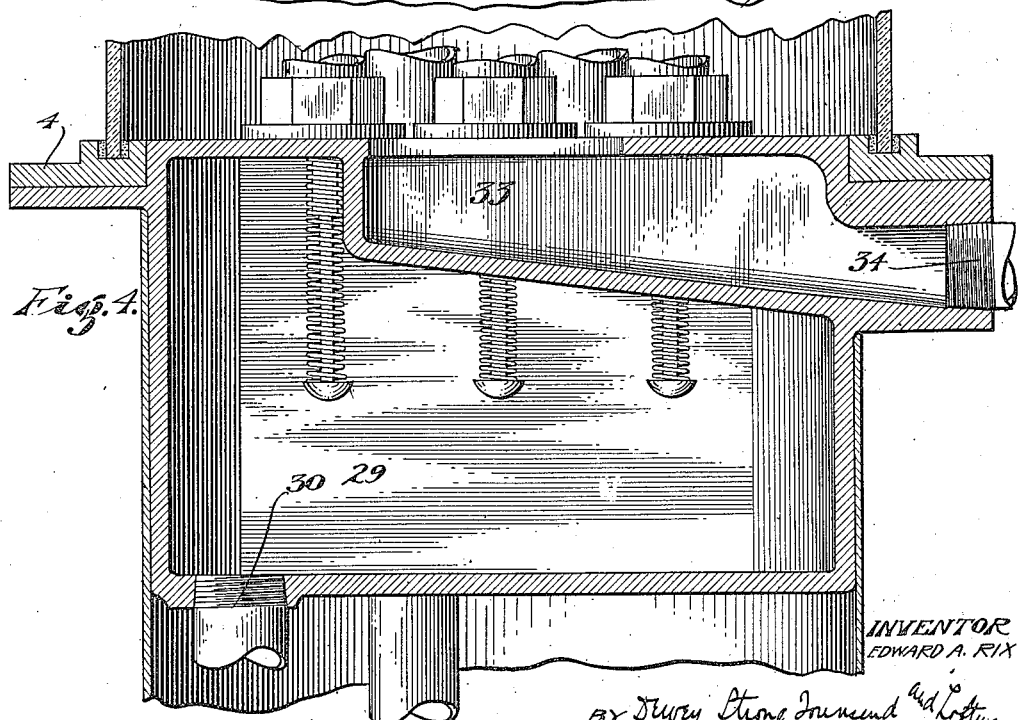

E. A. RIX

LIQUID MEASURING AND DISPENSING DEVICE

Filed June 12, 1922      3 Sheets-Sheet 3

INVENTOR
EDWARD A. RIX

Patented May 27, 1924.

1,495,532

UNITED STATES PATENT OFFICE.

EDWARD A. RIX, OF SAN FRANCISCO, CALIFORNIA.

LIQUID MEASURING AND DISPENSING DEVICE.

Application filed June 12, 1922. Serial No. 567,861.

*To all whom it may concern:*

Be it known that I, EDWARD A. RIX, a citizen of the United States, residing at the city and county of San Francisco, State of California, have invented new and useful Improvements in Liquid Measuring and Dispensing Devices, of which the following is a specification.

This invention relates to a liquid measuring and dispensing device, and especially to that type employed in garages, automobile service stations, etc., where gasoline and like liquids are sold.

The object of the present invention is to generally improve and simplify devices of the character described: to provide a measuring device, embodying a transparent tank, permitting visible display of a measured quantity of liquid, and at the same time serving as a tamper-proof sealed housing for a series of measuring tubes of varying length; to provide a novel form of valve mechanism whereby overflow through the tubes is controlled; to provide means for opening and closing said valves in such a manner that only one valve may assume an opened position at any one time, and in conjunction therewith means for visibly indicating which valve is opened and the amount of liquid measured thereby. Further objects will hereinafter appear.

One form which my invention may assume is exemplified in the following description and illustrated in the accompanying drawings, in which—

Fig. 1 is a side elevation of the liquid measuring and dispensing device.

Fig. 2 is an enlarged central, vertical section of the same, the top portion of the apparatus being broken away.

Fig. 3 is a partial plan view of the measuring head.

Fig. 4 is a vertical section on line 4—4, Fig. 3.

Figure 5:
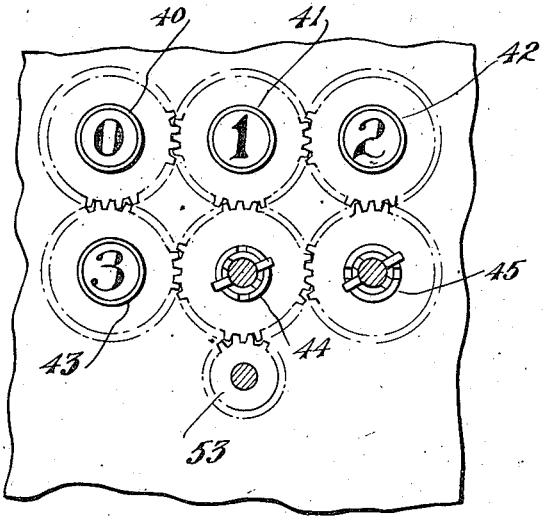
Fig. 5 is a front view of the valve actuating mechanism.

Referring to the drawings in detail, A indicates a standard or column, on the upper end of which is supported a measuring tank 2. This tank is cylindrical, octagonal, or otherwise shaped in cross section and is preferably constructed of glass to visibly display measured quantities of liquid. The glass wall of the tank is supported by a measuring head B, which is grooved, as at 3, for the reception of the wall section, and the upper end is enclosed by a head member 4, the head member 4 being similarly grooved and being secured in position by tie rods 5, which draw the parts together and maintain a tight joint. The standard or column A encloses a pair of cylinders 7 and 8. The cylinder 8 communicates with a storage tank or reservoir, not shown, by means of a suction pipe 9, on the upper end of which is mounted a check valve 10. The cylinder further communicates with the measuring tank by means of a pipe 11, said pipe passing through the measuring head B and entering the tank proper. The cylinder 8 is otherwise provided with a piston 13 of suitable construction, on which is mounted a pair of check valves 14, said valves being opposed in action to the check 10. The piston 13 is secured to a piston rod 15 which passes through a stuffing box 16 formed on the upper end of the cylinder. The rod then passes through a second stuffing box 17 and then enters the upper cylinder 8, where it is secured to a piston 18. This piston is subjected to air under pressure which is admitted through pipes 19 and 20, these pipes acting alternately as inlet and exhaust pipes. The pipes are connected with a controlling valve 21, which is manually turned to admit air either to one end of the cylinder 8 or the other, and reciprocal movement is thus transmitted to the pistons 13 and 18 in unison.

Figure 6:
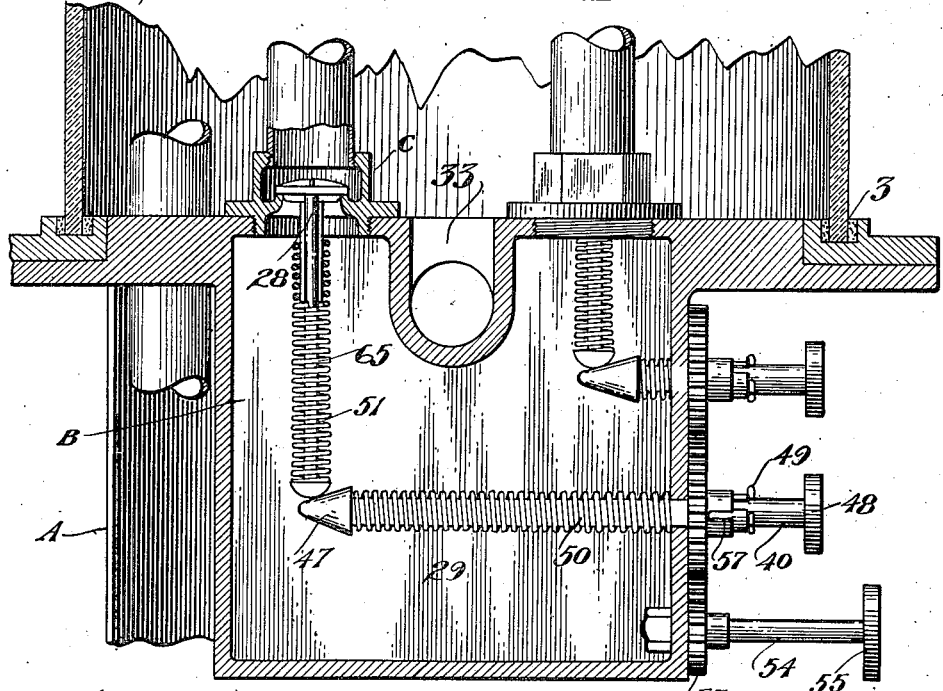
Fig. 6 is a vertical section on line 6—6, Fig. 3.

The mechanism so far described is employed for the purpose of delivering gasoline to the measuring tank and does not form any part of the present invention as any other means suitable for the purpose may be employed. The subject matter of the present invention embodies a measuring head, indicated at B, a series of measuring tubes supported thereby, a valve mechanism cooperating with said tubes, and a manual control means for opening and closing the valves, said means also visibly indicating which valve is opened and the amount of liquid which is being measured. The measuring head is perhaps best illustrated in Figs. 3, 4 and 6. The head proper is supported on top of the column A and is suitably secured thereto. Its upper surface is flat, as shown in Figs. 4 and 6, and this surface forms the bottom of the tank. There are six measuring tubes employed as indicated at 22, 23, 24, 25, 26 and 27. These tubes are supported by valve cages C, and these cages in turn support valves as indicated at 28. The cages are provided with threaded extensions on their lower ends, which are screwed into the measuring head, and the upper ends of the cages are internally threaded to receive the measuring tubes. The tubes are of varying length, as illustrated, and to this extent control the amount of liquid retained by the measuring tank during the measuring operation. Each tank is nothing more or less than an overflow tube and they all communicate with a chamber 29, which in turn is connected with a source of supply by means of a return tube 30. The shortest tube is provided for the purpose of measuring a quantity of liquid equivalent to one gallon, the second tube the amount equivalent to two gallons, and so on. For instance if it is desired to measure and dispense one gallon, it is only necessary to open the valve 28, which aligns with the shortest tube, and similarly to close the valves aligning with the remaining tubes. Thus, when the piston 30 is moved in an upward direction, by means of air acting on the piston 18, it can be seen that the gasoline will discharge through pipe 11 into the measuring tank and will substantially fill the same. The gasoline will however overflow or discharge through the shortest tube until the level of the gasoline aligns with the top of said tube. Further overflow will then be prevented and the remaining gasoline is trapped in the measuring tank. This gasoline is then removed by opening a service valve, indicated at 31, and it is here discharged through a hose 32 to the tank of the automobile. If the purchaser wishes five gallons, the valve 28 aligning with the measuring tube controlling this amount is opened and the remaining valves are closed. Gasoline will again be delivered by means of the piston 13 and any quantity in excess of five gallons will thus discharge through the five gallon tube into the chamber 29, from where it will drain or return to the source of supply through the pipe 30. The liquid trapped within the measuring tank will in this case be five gallons and this is discharged through the hose line 32 when valve 31 is opened. To permit complete draining of the measuring tank, a pocket or recess 33 is formed therein and this recess is connected by a pipe 34 with the valve 31, complete draining being in this manner obtained.

In Fig. 5 it will be seen that nine pipes are illustrated: first, those indicated at 22, 23, 24, 25, 26 and 27; secondly, the drain pipe indicated at 30 and illustrated by dotted lines; third, a supply pipe or that indicated at 11, and fourth, an auxiliary overflow which is indicated at 35. This pipe also communicates with the supply tank or source of supply and does not only serve as an auxiliary overflow, but as a venting pipe to prevent formation of pressure within the measuring tank when gasoline is being delivered thereto.

Figure 7:
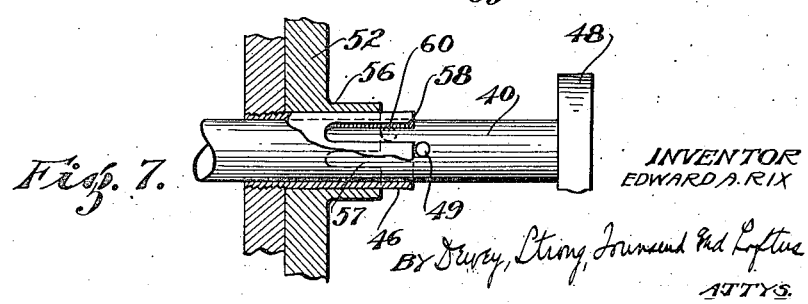
Fig. 7 is an enlarged detail view partially in section showing one of the valve actuating devices.

One of the novel, important features of the present invention is the mechanism employed for opening and closing the valves 28. This mechanism is so arranged that only one valve may assume opened position, and it further insures complete closure of the remaining valves when one is opened. This mechanism is best illustrated in Figs. 5, 6 and 7, and is constructed and operated as follows:

Extending through one side of the chamber 29 is a series of stems 40, 41, 42, 43, 44 and 45. Each stem passes through a bushing, as shown at 46, in Fig. 7, and each stem is provided with a cone shaped cam 47, a head member 48, and a cross pin 49. A spring surrounds each stem, as indicated at 50, and these springs are interposed between the cams 47 and the side wall of the chamber 29. They are furthermore so arranged that endwise movement will be imparted to the stems under certain conditions; said endwise movement brings the cams 47 into engagement with the headed lower ends of stems 51 secured to the respective valves 28, and when such engagement is made upward movement is imparted to the stem and the valve attached thereto and a valve is opened. The remaining valves will however assume a closed position and this is accomplished as follows:

Turnably mounted on each bushing member 46 is a gear 52. These gears all intermesh, as shown in Fig. 5, and they are rotated in unison by means of a master gear indicated at 53. This master gear is keyed to a rod 54 and this is in turn provided with a head member 55 by which it is rotated, the rod 54 being journalled in the wall of the chamber 29 as illustrated in Fig. 6. Each gear 52 is provided with a hub section 56 and each hub section is longitudinally slotted as indicated at 57. The bushings 46 are similarly slotted, as indicated at 58, and registration of the slots 57 and 58 will take place when the gears 52 are rotated. All of the slots 58 formed in the bushings 46 align with each other, but the slots 57 formed in the gear hubs are placed 60° apart, thus causing selective or successive registration of the slots 57 with the slots 58. The stems 40, by referring to Figs. 6 and 7, are longitudinally movable in the bushings 46 and they are also turnable therein, hence if it is desired to open a certain valve it is only necessary to turn a certain stem 40 by means of its head member 48 until the cross pin 49 registers with the slot 58 in the bushing 46. When this takes place a slight longitudinal or inward movement of this certain stem 40 will take place, said inward movement being caused by the pull or pressure of the cooperating spring 50. The inward movement taking place is however very slight and the position assumed will be the dotted line position indicated at 60, that is cross pin 49 will rest on the outer end of the gear hub 56, and further inward movement of the stem 40 will be prevented until registration is formed between the slots 58 and 57. Such registration is obtained by grasping the knob or head member 55 and imparting rotary movement to the rod 54 and the master gear 53. This gear, as previously stated, intermeshes with one of the gears 52 and as all of the gears 52 intermesh, all will rotate in unison. Registration will thus be established between the slots 57 and 58, where the cross pin has been dropped into the slot 58, and when this registration is established further inward movement will take place and cam 57 will engage the head of the stem 51 of a certain valve, thus imparting upward movement to the stem and opening the valve. The remaining valves will remain in closed position as inward movement is first prevented due to the fact that the cross pins 49 have not been moved into alignment with their respective slots 58, and secondly even though they should have been moved into alignment with said slots no registration will be formed with the gear hub slots 57 as these slots are placed 60° apart and can only register in selective or successive order. In this connection it might be stated that each valve stem 51 is surrounded by a helical spring 65, which exerts a downward pressure, thus maintaining the valves in closed position. The tension or pressure exerted by the helical springs 50 is however greater than that exerted by the spring 65 and opening of the valves is thus permitted when final inward movement of any particular stem 40 is permitted.

From the foregoing description it should be obvious, first, that only one valve 28 may be opened and that the remaining valves will be retained in a closed position. Secondly that the valve which is opened will be visibly indicated as the head member 48 cooperating with the opened valve will assume a depressed position with relation to the remaining head members. Third, that the amount of liquid being measured by the opened valve will also be visibly displayed as each member carries a numeral indicating the number of gallons being measured. The entire mechanism is exceedingly simple and may be readily and quickly set for any number of gallons desired, and any chance of making a mistake when opening one valve or another is eliminated as the valve opened and the amount of liquid measured thereby will in all cases be visibly displayed.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. In a liquid measuring and dispensing device of the character described a tank, a measuring head supporting the tank and forming a bottom therefor, a drain chamber formed in the head, a plurality of tubes of varying length disposed within the tank and supported by the head, said tubes communicating at their lower ends with the drain chamber, a valve for each tube forming a normal closure therefor, a stem on each valve, a head member on the lower end of each stem, a spring on each valve stem engageable with the head to normally maintain the valves in closed position, a plurality of stems disposed at right angles to the valve stems, one in alignment with each valve stem, a cam member on one end of each last named stem adapted to engage the heads of the valve stems, a bushing for each last named stem, a head member in the opposite end of each stem whereby longitudinal and turning movement may be imparted to each stem, a slot formed in each bushing, a cross pin in each stem adapted to be turned into or out of alignment with said slots, a slotted sleeve on each stem adapted to register with the slots in the respective bushings, and means for rotating the sleeves in unison to bring about such registration.

2. In a liquid measuring and dispensing device of the character described a tank, a measuring head supporting the tank and forming a bottom therefor, a drain chamber formed in the head, a plurality of tubes of varying length disposed within the tank and supported by the head, said tubes communicating at their lower ends with the drain chamber, a valve for each tube forming a normal closure therefor, a stem on each valve, a head member on the lower end of each stem, a spring on each valve stem engageable with the head to normally maintain the valves in closed position, a plurality of stems disposed at right angles to the valves stems one in alignment with each valve stem, a cam member on one end of each last named stem adapted to engage the heads of the valve stems, a bushing for each last named stem, a head member in the opposite end of each stem whereby longitudinal and turning movement may be imparted to each stem, a slot formed in each bushing, a cross pin in each stem adapted to be turned into or out of alignment with said slots, a slotted sleeve on each stem adapted to register with the slots in the respective bushings, and means for rotating the sleeves in unison to bring about such registration, said slotted sleeves having their slots arranged in staggered formation and said slotted bushings having their slots formed in alignment to prevent simultaneous registration of more than one set of cooperating slots.

3. In a liquid measuring and dispensing device of the character described a measuring head, a plurality of measuring tubes of varying length supported thereby, a valve in the lower end of each tube forming a normal closure therefor, a valve stem on each valve, a horizontally disposed stem in alignment with each valve stem, a slotted bushing forming a bearing for each horizontal stem, the slots in said bushing being disposed in alignment, a slotted sleeve on each bushing, the slots in said sleeve being staggered to prevent simultaneous registration of more than one set of cooperating slots, a pin on each horizontal stem, manually actuated means for turning the horizontal stems and the pins mounted thereon into or out of alignment with the bushing slots, means for rotating the slotted sleeves in unison, and a cam member on each horizontal stem engageable with the head of the valve stems.

4. In a liquid measuring and dispensing device of the character described a measuring head, a plurality of measuring tubes of varying length supported thereby, a valve in the lower end of each tube forming a normal closure therefor, a valve stem on each valve, a horizontally disposed stem in alignment with each valve stem, a slotted bushing forming a bearing for each horizontal stem, the slots in said bushing being disposed in alignment, a slotted sleeve on each bushing, the slots in said sleeve being staggered to prevent simultaneous registration of more than one set of cooperating slots, a pin on each horizontal stem, manually actuated means for turning the horizontal stems and the pins mounted thereon into or out of alignment with the bushing slots, means for rotating the slotted sleeves in unison, a cam member on each horizontal stem engageable with the head of the valve stems, and a spring on each horizontal stem causing forward projection and engagement of the cams with the headed valve stems when a set of cooperating slots registers.

5. In a device of the character described a plurality of stationary bushings slotted at one end, a support therefor, a stem turnably and slidably mounted in each bushing and projecting through the respective bushings and support, a gear turnably mounted on each bushing, said gears intermeshing and adapted to be rotated in unison by means of a master gear, a hub on each gear, and a slot formed in each hub, the slots in said hubs being staggered to prevent simultaneous registration of the slots in the hubs with the slots in the bushings.

6. In a device of the character described a plurality of stationary bushings slotted at one end, a support therefor, a stem turnably and slidably mounted in each bushing and projecting through the respective bushings and support, a gear turnably mounted on each bushing, said gears intermeshing and adapted to be rotated in unison by means of a master gear, a hub on each gear, a slot formed in each hub, the slots in said hubs being staggered to prevent simultaneous registration of the slots in the hubs with the slots in the bushings, a cross pin on each stem adapted to be turned into or out of register with the bushing slots, a cam member on each stem, and a spring surrounding each stem and interposed between the cam member and the support.

EDWARD A. RIX.